United States Patent
Falk et al.

(10) Patent No.: US 9,094,818 B2
(45) Date of Patent: Jul. 28, 2015

(54) METHOD FOR CRYPTOGRAPHICALLY TRANSMITTING DATA BETWEEN NETWORK NODES USING A NONCE VALUE

(75) Inventors: Rainer Falk, Erding (DE); Hans-Joachim Hof, München (DE); Ulrike Meyer, Aachen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 425 days.

(21) Appl. No.: 12/998,029

(22) PCT Filed: Aug. 19, 2009

(86) PCT No.: PCT/EP2009/060700
§ 371 (c)(1), (2), (4) Date: Mar. 10, 2011

(87) PCT Pub. No.: WO2010/028936
PCT Pub. Date: Mar. 18, 2010

(65) Prior Publication Data
US 2011/0158410 A1    Jun. 30, 2011

(30) Foreign Application Priority Data

Sep. 10, 2008 (DE) .......................... 10 2008 046 563

(51) Int. Cl.
*H04W 12/02* (2009.01)
*H04L 9/32* (2006.01)
(Continued)

(52) U.S. Cl.
CPC ............ *H04W 12/02* (2013.01); *H04L 9/3242* (2013.01); *H04L 63/1466* (2013.01); *H04L 2209/805* (2013.01); *H04W 12/12* (2013.01); *H04W 84/18* (2013.01)

(58) Field of Classification Search
None
See application file for complete search history.

(56) References Cited

U.S. PATENT DOCUMENTS 5,515,439 A * 5/1996 Bantz et al. .................... 713/156
6,789,195 B1 * 9/2004 Prihoda et al. ................ 713/182
(Continued)

FOREIGN PATENT DOCUMENTS

DE   10 2008 046 563.1      9/2008
JP         8-335040         12/1996
(Continued)

OTHER PUBLICATIONS

Haowen Chan et al., "PIKE: Peer Intermediaries for Key Establishment in Sensor Networks," 24th Annual Joing Conference of the IEEE Computer and Communications Societies, vol. 1, Mar. 2005 pp. 524-534 and abstract; http://ieexplore.ieee.org/stamp/stamp.jsp?tp=&arnumber=1497920.

(Continued)

*Primary Examiner* — Aravind Moorthy
*Assistant Examiner* — Jason Plotkin
(74) *Attorney, Agent, or Firm* — Staas & Halsey LLP (57) ABSTRACT

A method transmits data between network nodes of a network in a cryptographically protected manner. The network nodes are, for example, sensor nodes of a wireless sensor network. In the method, in order to transmit the data in a message, a NONCE value is created from a count value which is updated in the transmission of the message and from a constant value which is provided in a shared manner to the network nodes of the network. The data transmitted in the message is then encrypted and decrypted within the network nodes by a cryptographic key and the created NONCE value. The method offers in particular protection against replay attacks while at the same time minimizing the use of resources of the network nodes.

14 Claims, 6 Drawing Sheets

(51) Int. Cl.
*H04L 29/06* (2006.01)
*H04W 12/12* (2009.01)
*H04W 84/18* (2009.01)

(56) References Cited

U.S. PATENT DOCUMENTS

| | | | |
|---|---|---|---|
| 6,952,685 B1 * | 10/2005 | Hunter et al. | 705/58 |
| 7,177,424 B1 | 2/2007 | Furuya et al. | |
| 7,434,046 B1 * | 10/2008 | Srivastava | 713/163 |
| 8,161,353 B2 * | 4/2012 | Flynn et al. | 714/763 |
| 8,175,277 B2 * | 5/2012 | Bell et al. | 380/278 |
| 2003/0026433 A1 * | 2/2003 | Matt | 380/278 |
| 2003/0210787 A1 | 11/2003 | Billhartz et al. | |
| 2005/0050004 A1 | 3/2005 | Sheu et al. | |
| 2008/0032693 A1 * | 2/2008 | Ozluturk | 455/436 |
| 2008/0044014 A1 * | 2/2008 | Corndorf | 380/37 |

FOREIGN PATENT DOCUMENTS

| | | |
|---|---|---|
| JP | 10-301492 | 11/1998 |
| JP | 2001/007800 | 1/2001 |
| JP | 2003/229844 | 8/2003 |
| JP | 2006-514789 | 5/2006 |
| JP | 2008-72241 | 3/2008 |
| WO | WO 2007068638 A1 * | 6/2007 |
| WO | 2008/011376 | 1/2008 |
| WO | WO 2008011376 A2 * | 1/2008 |
| WO | 2008/030704 | 3/2008 |
| WO | 2009/060700 | 8/2009 |

OTHER PUBLICATIONS

Rainer Falk et al., "From Academia to the Field: Wireless Sensor Networks for Industrial Use," 7. GI/ITG Kuvs Fachgespräch Drahtlose Sensornetze, Sep. 2008, 6 pages; http://www.mi.fu-berlin.de/inf/groups/ag-tech/publications/1_resources/tr-b-08-12.pdf?1346661597.

Okamoto, Eiji "Encryption Technology for Realizing a Bright Information Society 5: Management of Encryption Key Distribution", Japan, Kyoritsu Shuppan Co., Ltd., Nov. 1, 1991, vol. 23, No. 12, pp. 51-59.

Makoto Obayshi et al., "Tiny MRL: Secured Cooperative Multi-Agent System in Limited Resources for Sensor Network", IEICE Transactions D, The Institue of Electronics, Information and Communication Engineers (IEICE), vol. J89-D, No. 8, pp. 1764-1776, 2006.

IEEE 802: "Part 15.4: Wireless Medium Access (MAC) and Physical Layer (PHY) Specifications for Low-Rate Wireless Personal Area Networks (WPANs)," IEEE Std 802.15.4™-2006, Sep. 8, 2006, 323 pages.

Yang Xiao et al., "Security Services and Enhancements in the IEEE 802.15.4 Wireless Sensor Networks," Global Telecommunications Conference, 2005, IEEE Globecom 2005, vol. 3, pp. 1796-1800.

International Search Report for PCT/EP2009/060700, mailed on Dec. 10, 2009.

* cited by examiner

METHOD FOR CRYPTOGRAPHICALLY TRANSMITTING DATA BETWEEN NETWORK NODES USING A NONCE VALUE

CROSS REFERENCE TO RELATED APPLICATIONS

This application is based on and hereby claims priority to International Application No. PCT/EP2009/060700 filed on Aug. 19, 2009 and German Application No. 10 2008 046 563.1 filed on Sep. 10, 2008, the contents of which are hereby incorporated by reference.

BACKGROUND

The invention relates to a method for transmitting data between network nodes of a network in a cryptographically protected manner.

Wireless sensor networks or sensor-actuator networks WSN are very versatile in their applications. For example wireless sensor networks are used for monitoring and controlling production plants, for monitoring and controlling chemical processes, and for monitoring pipelines. In wireless sensor networks the network's sensor nodes communicate wirelessly over a radio interface. Data is transmitted in accordance with a data-transmission protocol. The 802.15.4 protocol, Zig Bee, Wireless HART, and Bluetooth are known data-transmission protocols for transmitting data over a radio interface. Measured values and control commands are exchanged between the sensor nodes by messages.

The data exchanged between the network's nodes is cryptographically protected to prevent the wirelessly transmitted messages from being manipulated by unauthorized third parties. Owing to the limited performance capabilities of network nodes in terms of storage space and compute power in wireless sensor networks in particular, and because of the restricted energy resources, especially when the nodes are battery-operated, there is a need for an efficient security solution.

The transmitted data is conventionally encrypted by a key to secure it. Simple encryption K is not fully secure, however, as a third party has the opportunity to reenter messages in what are termed "replay attacks". What are termed NONCE values are therefore employed in conventional networks. A NONCE value is a one-off value or, as the case may be, a value that is to be used once only. The NONCE value serves to detect reentered messages (replay attacks). The data, for example measurement data, will then be encrypted by a transmitting node, for example a sensor node, as a function of a key K and a NONCE value. Said NONCE value is referred to also as an initializing vector. The transmitting node sends a message or, as the case may be, frame F to a receiving node within the network. Each NONCE value is used once only in conjunction with each key. The once-only characteristic of the NONCE value used in the received message is therefore checked on the receiving-node side to achieve effective protection from message reentering or, as the case may be, replay attacks. Frequently employed cryptographic methods for protecting data frames, for example in the case of 802.15.4 or WLANs, furthermore require a NONCE value or, as the case may be, an initializing vector not to be allowed to be used more than once with each key. The cryptographic protection would otherwise be diminished. A new key K' must therefore be set up (re-keying) no later than when the value range for NONCE values is exhausted.

When NONCE values are used for protecting against replay attacks it is, though, necessary for status information about already used NONCE values to be stored on the recipient's side, meaning on a receiving-node side. Because a network can be formed of a multiplicity of nodes and each node has to store associated status information about the NONCE values already used by the respective node for every other node of the network from which it can potentially receive a message or, as the case may be, frame, the result is a heavy load on resources owing to the space needed for storing the status information. The space requirements in each node will be high particularly when there are many end-to-end security relationships between the various nodes in the network and because for each end-to-end security relationship a NONCE value has to be stored in the node.

SUMMARY

On possible object is hence to provide a method for transmitting data between network nodes of a network in a cryptographically protected manner, with which method the space requirements for storing status information for NONCE values are low.

The inventors propose a method for transmitting data between network nodes of a network in a cryptographically protected manner, with the following steps being performed for transmitting the data in a message:
  a) Creating a NONCE value from a count value that is updated when the message is transmitted and from a constant value that is made available to the network nodes of the network in shared fashion; and
  b) encrypting and decrypting the data transmitted in the message by a cryptographic key and the created NONCE value.

In an embodiment of the method the shared constant value employed throughout the network is made available to the other network nodes of the network by a central management network node.

That offers the advantage of enabling the constant value employed throughout the network to be administered in a simple manner and, where applicable, exchanged with little effort for enhancing the network's security against manipulation. The constant value employed throughout the network has to be stored on a network node once only regardless of the number of network nodes. It is furthermore unnecessary for a network node to store a count value permanently—which is to say also when the power supply is disconnected, for instance, or when the battery is replaced—to prevent the same NONCE value from being used more than once by said network node, because once the power supply has been connected to the network node and operation has commenced it can be assigned a current constant value employed throughout the network.

In an embodiment of the method the NONCE value is created additionally as a function of a transmitting-node address of the transmitting network node that transmits the message to a receiving network node of the network.

Security against replay attacks will be further enhanced thereby.

In an embodiment of the method the shared constant value is conveyed to the network nodes of the network by the central management network node by sending a broadcast message or by sending unicast messages.

The shared, constant value employed throughout the network can thereby be updated simply and quickly.

In another embodiment of the method the shared constant value can be reconfigured by the central management network node.

Said reconfiguring of the shared constant value takes place in a possible embodiment at fixed, regular intervals.

In an alternative embodiment the shared constant value that is used for creating a NONCE value is reconfigured when a predefined volume of transmitted data has been exceeded.

In another embodiment of the method the shared constant value is reconfigured when a predefined number of transmitted messages has been exceeded.

In another embodiment of the method the shared constant value is reconfigured when a predefined counter value has been attained for one of the network nodes of the network.

In another embodiment of the method the shared constant value will be reconfigured if a predefined event occurs.

In another embodiment of the method the predefined event is the acceptance of an additional network node into the network, for example when a network node starts communicating with the network after a power supply has been connected.

In another embodiment of the method the shared constant value is reconfigured when data meeting a predefined condition is transmitted.

The various embodiments for reconfiguring the shared constant value allow the method for transmitting data between network nodes of a network in a cryptographically protected manner to be flexibly employed for all kinds of applications and to satisfy the various security requirements.

In another embodiment of the method the NONCE value is created by concatenating or, as the case may be, chaining the transmitting-node address of the transmitting network node, the shared constant value, and a count value that is generated by an internal counter of the transmitting network node.

That embodiment offers the advantage of being able to create the NONCE value with relatively little effort in circuitry terms accompanied by low current or, as the case may be, energy consumption.

In another embodiment of the method the NONCE value is created through a hash function of concatenating the transmitting-node address of the transmitting network node, the shared constant value, and the count value that is generated by an internal counter of the transmitting network node.

That embodiment offers the advantage that a third party, even when intercepting a message being transmitted, will be unable to detect the NONCE value currently employed by the transmitting network node so that security against manipulating will be enhanced.

In another embodiment of the method the data transmitted in the message is encrypted and decrypted by a CCM algorithm.

In a possible embodiment of the method the transmitted message contains header data that includes a transmitting-node address, a receiving-node address, and the current count value of the transmitting network node, as well as useful data containing the encrypted data.

In another embodiment of the method the receiving network node compares the transmitting network node's count value transmitted in the message with a count value of an internal counter of the receiving network node, which value is selected using the transmitting-node address transmitted in the message, and from the transmitted count value, the shared constant value, and the transmitted transmitting-node address will create a NONCE value on the receiving side if the transmitted count value is more current than the selected count value, with the NONCE value created on the receiving side and a key stored in the receiving network node being used for decrypting the data transmitted in the message in encrypted form.

In another embodiment of the method the message is transmitted from the transmitting network node to the receiving network node over a radio interface.

The inventors further propose a network formed of a plurality of network nodes that transmit data among themselves in messages, with each network node having:
   a) a unit for creating a NONCE value from a count value that is updated when a message is transmitted and from a constant value that is made available to the network nodes of the network in shared fashion; and
   b) a unit for encrypting and decrypting the data transmitted in the message by a cryptographic key and the created NONCE value.

In an embodiment of the network the network has a central management network node that makes the shared constant value available to the other network nodes of the network.

In an embodiment of the network each network node has at least one sensor.

The inventors further propose a computer program having program instructions for executing a method for transmitting data between network nodes of a network in a cryptographically protected manner, with the following steps being performed for transmitting the data in a message:
   a) creating a NONCE value from a count value that is updated when the message is transmitted and from a constant value that is made available to the network nodes of the network in shared fashion; and
   b) encrypting and decrypting the data transmitted in the message by a cryptographic key and the created NONCE value.

A data carrier stores a computer program of such kind.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
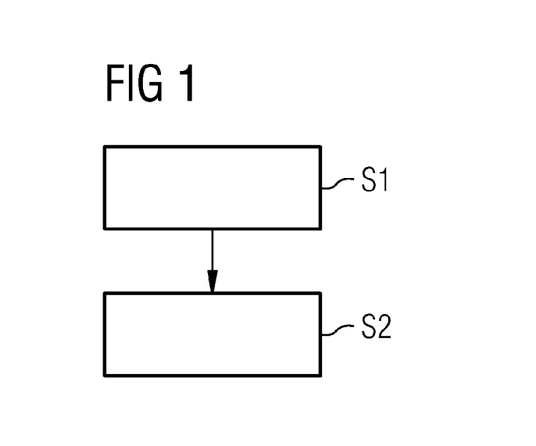
FIG. 1 is a simple flowchart for presenting an exemplary embodiment of the proposed method for transmitting data in a cryptographically protected manner.

As can be seen from FIG. 1, the proposed method for transmitting data between network nodes of a network in a cryptographically protected manner substantially comprises two steps.

A NONCE value N is created at a first step S1. Said NONCE value N is created from a count value CTR, which is updated during ensuing transmission of the message or, as the case may be, frame F, and from a constant value EANCV (Externally Assigned Nonce Contribution Value). Said shared constant value EANCV employed throughout the network is made available to the network nodes of the proposed network in shared fashion. In a possible embodiment the constant value EANCV employed throughout the network is made available to the other network nodes of the network by a central management network node, for example by way of a broadcast message or of unicast messages. In a possible embodiment the management network node sends the constant value EANCV to all other network nodes of the network by way of a broadcast message. In an alternative embodiment the management network node sends the constant value EANCV to each network node by way of a respective unicast message. In another embodiment the NONCE value N is created not only as a function of a count value CTR and of the constant value EANCV but, additionally, as a function also of a transmitting-node address SA of the transmitting network node that transmits the sent message F to another receiving network node of the network.

When a NONCE value N has been created at step S1, the data transmitted in the message F is encrypted or decrypted at step S2 in each case by a cryptographic key K and by the created NONCE value N. A transmitting network node wishing to transmit data to a receiving network node in a protected manner encrypts the data by a cryptographic key K and the NONCE value N created on the transmitting side.

When a message F has been received, the message F is decrypted again by the receiving node by a corresponding cryptographic key K and the NONCE value.

Figure 2:
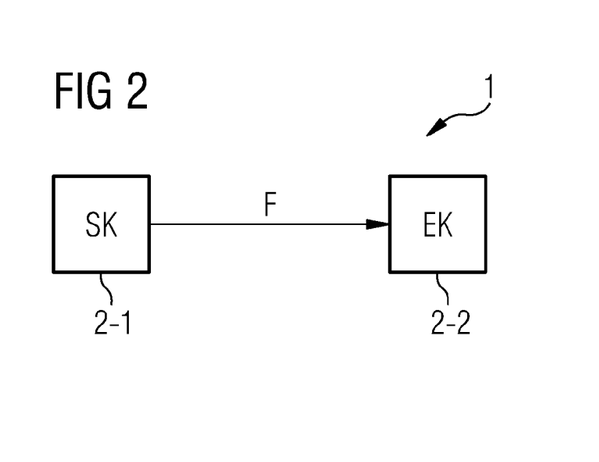
FIG. 2 is a simple block diagram for presenting the transmission of a message between a transmitting node and a receiving node of the proposed network.

FIG. 2 is a schematic showing the transmission of a message or, as the case may be, a frame F within a network 1 from a transmitting node 2-1 to a receiving node 2-2 of network 1. Network 1 can be formed of a multiplicity of network nodes 2 that exchange frames F among themselves. The frames or, as the case may be, messages F are transmitted between network nodes 2 of the network either directly or indirectly over other network nodes of the network. Network nodes 2 can be, for example, network nodes that contain one or more sensors. Said sensor network nodes transmit the logged measurement data of the sensors in messages F or, as the case may be, frames to other network nodes for being evaluated. The sensors can be any sensors, for example temperature probes or suchlike. In a preferred embodiment of the method the measurement data is transmitted in messages or, as the case may be, data packets or frames F.

Figure 3:
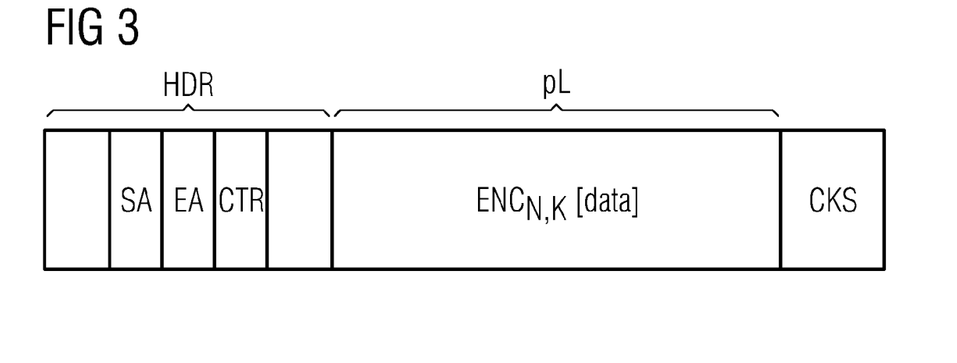
FIG. 3 is a diagram for presenting a possible data format of a message transmitted using the method.

FIG. 3 shows a possible data format such as can be used for the method. The frame F has header or, as the case may be, administrative data HDR. Said header data HDR contains information about the frame F, particularly about the identity of the transmitting node or the identity of the receiving node. As shown in FIG. 3, the header HDR contains inter alia a transmitting-node address SA, a receiving-node address EA, and other administrative data. The transmitting address SA and the receiving address EA can be, for example, a MAC address.

In the method the header HDR additionally contains a count value CTR that is generated by, for example, an internal counter of transmitting network node 2-1. Said count value CTR is updated when a message F is transmitted from the transmitting node 2-1 to the receiving nodes 2-2, with updating including as a rule in incrementing the count value CTR. The header data HDR is immediately followed in the data packet or, as the case may be, frame F by useful data or, as the case may be, payload data. Said useful data is for example encrypted data from one or more sensors of transmitting node 2-1. The data or, as the case may be, measurement data of transmitting node 2-1 indicates for example the location or, as the case may be, the coordinates of transmitting node 2-1 and the temperature prevailing there. The encrypted data can, though, also include control data or, as the case may be, control instruction data. The useful data of the frame F shown in FIG. 3 has been encrypted by a key K and a NONCE value N. The message or, as the case may be, the frame F can moreover contain a checksum CKS. Said checksum can have a digital signature or a message authentication code.

Apart from the transmitting address SA of transmitting node 2-1 or, as the case may be, the transmitting ID and from the receiving address EA of the receiving node or, as the case may be, the receiving ID having the updated count value (TR), the header data HDR of the frame F shown in FIG. 3 may possibly contain additional administrative data such as, for instance, a type of frame, a length of the data field or, as the case may be, a volume of the useful data contained in the data packet (length), and other flags. The type of frame or, as the case may be, message can indicate, for example, whether it is a data frame, a control command, or an acknowledgement instruction. Within the header HDR it is possible to indicate, for instance, that a security mechanism has been activated (Security Enable) or which protocol version is being used. In a possible embodiment of the method the data transmitted in the message F is cryptographically encrypted by a CCM algorithm as specified in, for example, 802.15.4-2006. That encryption method makes it possible to ensure confidentiality, integrity, or both.

The frame F or, as the case may be, message N shown in FIG. 3 exchanged between nodes 2 of network 1 can be transmitted wirelessly or on a wire-linked basis. Wireless communication between network nodes 2 offers advantages in numerous industrial applications. The advantages include, for example, low installation costs, flexible installation of network nodes 2 for preventing mechanical wear-and-tear on cables or sliding contacts, and simple expandability of network 1. The method allows data to be transmitted between network nodes 2 of a wireless network 1 of such type in a cryptographically protected manner, with protection particularly from reentered messages or, as the case may be, replay attackers being provided.

Figure 4:
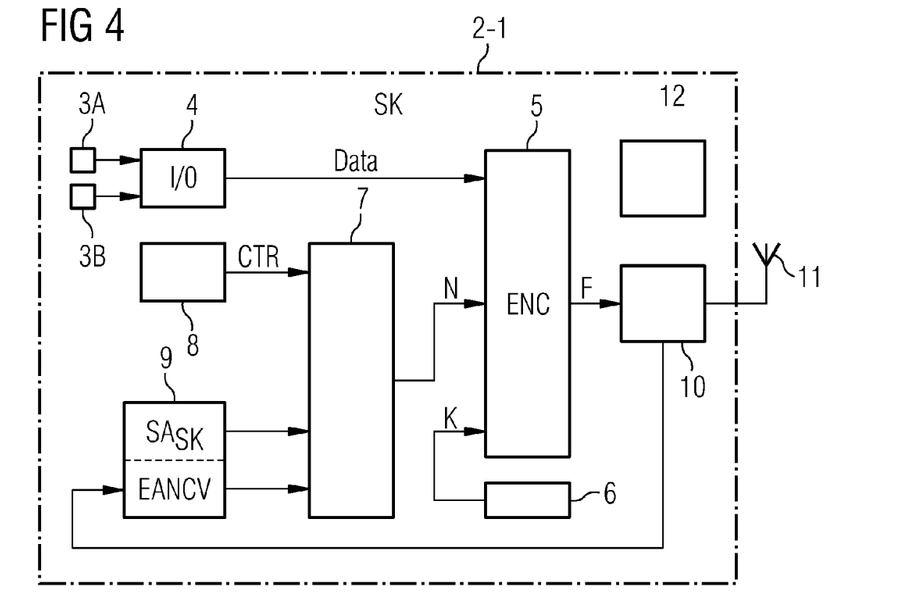
FIG. 4 is a block diagram of an exemplary embodiment of a network node contained in the network for presenting an encryption of data.

FIG. 4 is a block diagram of a network node 2 within network 1. The block diagram shown in FIG. 4 represents the creation of a NONCE value N in a transmitting node 2-1 and data encrypting with the aid of a cryptographic key K and of the created NONCE value N. Transmitting node 2-1 shown in FIG. 4 contains two sensors 3A, 3B that supply measurement data to an encrypting device 5 via an input/output unit 4. A sensor node 2 of network 1 can have one or any number of different sensors 3. In an alternative embodiment, network node 2 has no sensors but other data that is read out from a memory, for instance, is transmitted in encrypted form to another network node 2 in a message F. Encrypting device 5 shown in FIG. 4 can be, for example, a processor CPU that executes an encryption algorithm. The encryption algorithm is a CCM algorithm, for example. In particular the AES or DES algorithm can therein be used as the basic block cipher. The data that is fed out by input/output unit 4 and can originate from sensors 3, for instance, is encrypted by a cryptographic key K, which is read out from a memory 6, and as a function of a created NONCE value N. Memory 6 can be, for example, a non-volatile flash memory.

The NONCE value N necessary for encrypting is created or, as the case may be, generated by a unit 7. That circuit or, as the case may be, unit 7 creates the NONCE value N from a count value CTR and from a constant value EANCV. The NONCE value N is created in a possible embodiment by unit 7 additionally as a function of a transmitting address SA of transmitting node 2-1. As can be seen from FIG. 4, transmitting node 2-1 contains an internal counter 8 that generates a count value CTR, with the count value being updated when a message F is transmitted or, as the case may be, sent. Updating can include, for example, incrementing the count value CTR. The count value CTR can in an alternative embodiment be updated also by being decremented. The count value CTR can in another embodiment be updated also by computing a sequence of numbers according to a predefined computing rule, for example for computing a pseudo random number sequence. The transmitting address SA of transmitting node 2-1 and the shared constant value EANCV can, as shown in FIG. 4, be read out from a memory 9. Memory 9 can be, for example, a RAM memory. Unit 7 creates in an embodiment a NONCE value N from the count value CTR and from the constant value EANCV. The NONE value N is created in an alternative embodiment additionally as a function of the transmitting-node address SA of transmitting nodes 2-1 that is read out from memory 9.

In a possible embodiment of the method the NONCE value N is created by unit 7 by concatenating or, as the case may be, chaining the transmitting-node address SA of transmitting network node 2-1, the shared constant value EANCV, and the count value CTR that is generated by the internal counter 8 of transmitting network nodes 2-1.

In that embodiment the respective bit sequences are concatenated or, as the case may be, appended to each other.

N:=SA|EANCV|CTR

In an alternative embodiment the NONCE value N is created by unit 7 by a hash function, for example MD5 or SHA1, SHA-256. The hash function is applied to concatenating of the transmitting-node address SA of transmitting network node 2-1, the shared constant value EANCV, and the count value CTR.

N:=HASH(SA|EANCV|CTR)

In alternative embodiments the transmitting-node address SA, the constant value EANCV, and the count value CTR can be concatenated or, as the case may be, appended to each other in any other sequences. For example the NONCE value can be created also as follows:

N:=SA|CTR|EANCV or

N:=EANCV|SA|CTR etc.

Unit 7 can be a permanently wired circuit in order to minimize the circuitry-specific effort. In an alternative embodiment the NONCE value N is created by unit 7 by running a corresponding program for creating a NONCE value N, with said NONCE-value-generating program being configurable in a possible embodiment. The created NONCE value N is made available to encrypting unit 5. Encrypting unit 5 can for its part be a permanently wired circuit or formed of a microprocessor. In a possible embodiment, creation of the NONCE value N and encrypting are performed by the same microprocessor with corresponding procedures being carried out. Encrypting unit 5 encrypts the data, for example sensor-measurement data, by a cryptographic key K and the NONCE value N created by unit 7. Encrypting can be symmetric or asymmetric. The encrypted data is thereupon packed as useful data into a frame F or, as the case may be, a data packet as shown in FIG. 3. Said frame F is emitted by a radio module 10 of node 2-1 via a transmitting/receiving antenna 11. Node 2-1 is supplied with power, as shown in FIG. 4, by a power-supply unit 12. In a preferred embodiment node 2 of network 1 has an autonomous power or, as the case may be, energy supply, for example a non-rechargeable battery, a rechargeable, or solar cells.

The constant value EANCV that is employed throughout the network and stored in memory 9 can in a preferred embodiment of the method be reconfigured by a central management node. If node 2-1 shown in FIG. 4 receives via transmitting/receiving antenna 11 a unicast message intended for it or a broadcast message, the constant value EANCV requiring to be employed throughout the network and received from a management network node is written into memory 9 by radio module 10. Transmitting node 2-1 can then use the current constant value EANCV of the network for encrypting.

The constant value EANCV is therein reconfigured on all sensor nodes 2 of network 1, meaning that every sensor node 2 of network 1 receives, stores, and uses the new constant value EANCV employed throughout the network.

In a possible embodiment the constant value EANCV employed throughout the network is reconfigured at fixed—which is to say regular—intervals, for example daily or monthly.

In an alternative embodiment the shared constant value EANCV will be reconfigured if the volume of data transmitted in network 1 exceeds a predefined data-volume threshold that can be set.

In an alternative embodiment the shared constant value EANCV will be reconfigured by the management node if a predefined number of transmitted messages F within network 1 is exceeded.

In another possible embodiment the constant value EANCV employed throughout the network will be reconfigured if a predefined number of transmitted messages F is exceeded for a node 2 within network 1.

In another embodiment of the method the constant value EANCV employed in shared fashion will be reconfigured if a counter within network 1 attains a predefined count value. The constant value EANCV will be reconfigured if, for instance, a predefined count value CTR is attained by an internal counter of a sensor node 2 or a gateway that can serve as a management network node. The threshold can in a possible embodiment be set depending on the application.

In another embodiment of the method the shared constant value EANCV will be reconfigured if a predefined event occurs. Reconfiguring of the shared constant value EANCV can be initiated automatically if, for example, a specific situation such as a security alert or suchlike is recognized by network 1. It is in that way not possible to reenter older NONCE values or to falsely present a fault-free condition of network 1 or, as the case may be, falsely present a special condition of network 1.

In another embodiment of the method the constant value EANCV will be reconfigured if the data transmitted in encrypted form meets a predefined condition. Reconfiguring can be performed if, for example, a temperature change greater than 5 Kelvin is registered in a sensor network 1. In that way it is not possible for older measured values, for example those having a difference greater than 5 Kelvin, to be reentered by an attacker. That means that a maximum measurement error an attacker is able to cause using reentered measurement messages will be limited.

The current or, as the case may be, reconfigured EANCV value is in a possible embodiment assigned to nodes 2 of network 1 by a central management node of network 1. That can be done by, for example, a broadcast message. The various network nodes 2 are alternatively each informed separately of the reconfigured constant value EANCV by a unicast message.

In an alternative embodiment the shared constant value EANCV can be automatically incremented or, as the case may be, increased by one at regular intervals in the respective network nodes. For example each network node 2 can increment its EANCV daily during the night at 01:00 hrs. In another embodiment it can be seen from the EANCV value used in messages F sent from other nodes 2 of network 1 that another node 2 has already changed over to an updated EANCV value. In that case a receiving node 2-2 which recognizes that a transmitting node 2-1 has changed over to an updated EANCV value can likewise set its EANCV value to the new one.

In another variant the EANCV values form what is termed a hash chain. An updated EANCV value and a previous EANCV value are therein linked to each other via a hash function, for example MD5, SHA-1, SHA-256:

Hash(EANCV-new)=EANCV-old.

Because a cryptographic hash function is not reversible it is virtually impossible to determine it from the old, previous EANCV value. If the new EANCV value is known, it is possible to check by calculating its hash value whether or not the new EANCV value is correct. Transmitting of the new hash value to network nodes 2 is hence protected from manipulation.

In another embodiment of the method the previous EANCV value is stored for a certain period of time after the updated new EANCV value has been entered and can continue being used. During a period of overlap it will in that way be possible to communicate using both EANCV values. Messages can in that way be exchanged also with network nodes 2 which do not yet have the updated EANCV value. During said period of overlap or, as the case may be, transition period a receiving node 2-2 will be able to use both EANCV values for determining which EANCV value will result in successful decryption. Two decrypting operations will, however, be necessary in that variant so that the compute effort will be relatively high.

In an alternative embodiment it is indicated in a bit or, as the case may be, a flag of the header HDR of the transmitted message F whether the previous or an updated EANCV value is to be used for decrypting. It is in that way clearly indicated which EANCV value has to be used for decrypting. The indicator flag changes whenever the constant value EANCV employed throughout the network in shared fashion is updated or, as the case may be, reconfigured.

Figure 5:
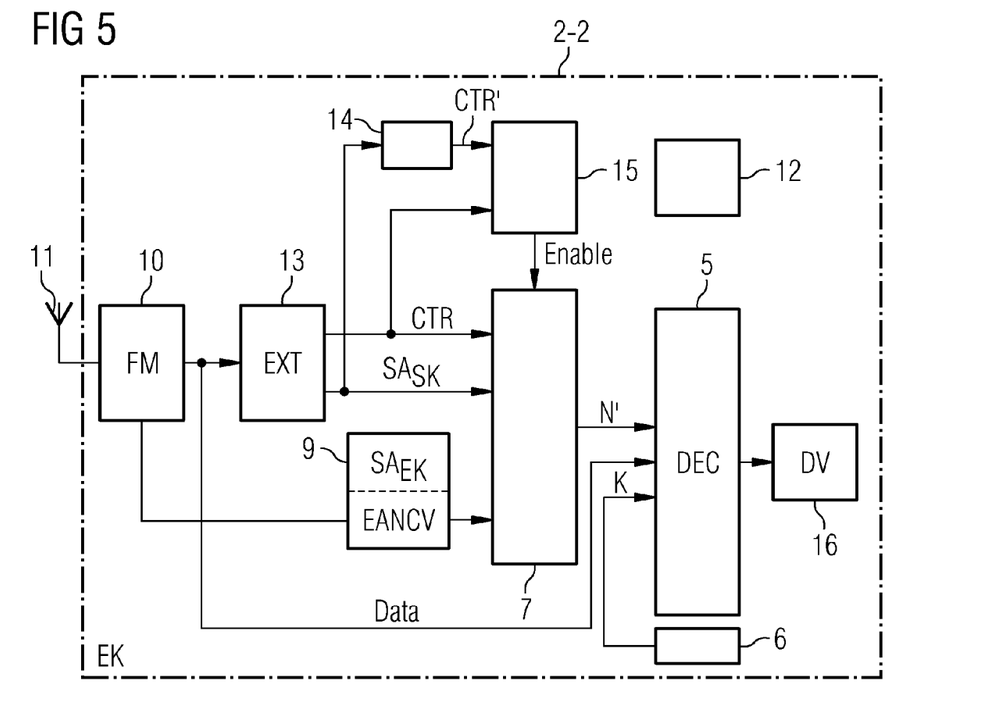
FIG. 5 is a block diagram of an exemplary embodiment of a receiving node contained in the network for presenting the decryption of a message.

FIG. 5 is a block diagram for presenting a decrypting operation within a receiving node 2-2 of network 1.

In a preferred embodiment of network 1 each node 2 within network 1 can function both as a transmitting node 2-1, as shown in FIG. 4, and as a receiving node 2-2, as shown in FIG. 5.

In the embodiment shown in FIG. 5 a decrypting unit (decrypt) contained in receiving node 2-2 is created by the same unit as the encrypting unit shown in FIG. 4, for example a CPU or, as the case may be, processor. The NONCE value N' is furthermore created on the receiving side by the same unit 7 as is used for creating the NONCE value N on the transmitting side. In the exemplary embodiment shown in FIG. 5, receiving node 2-2 receives over a wireless interface a transmitted frame F or, as the case may be, message N, for example in the data format shown in FIG. 3. The transmitted count value CTR and the transmitting address SA of transmitting node 2-1 are extracted by a unit 13 from the header data HDR of the received frame F. An internal counter 14 within receiving node 2-2 is selected or, as the case may be, addressed on the basis of the transmitting-node address SA-SK that is transmitted. The internal counter 14 makes a counter CTR' available. Said selected count value CTR' is compared in the embodiment shown in FIG. 5 by a comparator unit 15 with the count value CTR transmitted in the message or, as the case may be, frame F. If the transmitted count value CTR is more current than the selected count value CTR', comparator 15 will generate an enable signal for unit 7 for creating a NONCE value N' on the receiving side. The NONCE value N' is created in receiving node 2-2 in the same way as the NONCE value N is created within transmitting node 2-1 and is explained in conjunction with FIG. 4. The NONCE value N' created on the receiving side is routed to decoding unit 5 or, as the case may be, the CPU, which decrypts the data contained in the message F with the aid of the key K and the NONCE value N' created on the receiving side. The decrypted data can be processed or, as the case may be, evaluated by, for example, a data processing unit 16 within the receiving node. In a possible embodiment, decoding unit 5 in which a decoding or, as the case may be, decryption algorithm is executed, unit 7 for creating the NONCE value N', and data processing unit 16 form a unit in the form of, for example, a microprocessor. Decrypting unit 5 is in an alternative embodiment a permanently wired circuit specifically provided therefor.

In a preferred embodiment of the method the NONCE value created on the receiving or transmitting side is used once only with the same key K. The key K can therein be changed if a possible value range of the NONCE value has been exhausted. Transmitting node 2-1 constructs or, as the case may be, creates the NONCE value N for cryptographically protecting the frame requiring to be transmitted or, as the case may be, the transmitted data packet. Receiving node 2-2 therefore has the same NONCE value because of information contained in the data packet or, as the case may be, the received frame and possibly on the basis of stored status information, for example a count value. The currency of a NONCE value N can be ensured in various ways by transmitting node 2-1 and checked in various ways by receiving node 2-2. A count value CTR is used in the exemplary embodiment shown in FIG. 5 for ensuring the currency of the NONCE value N. So that the receiving node can check a NONCE value's currency, receiving node 2-2 stores information about the last received count value and thereafter only accepts NONCE values that are more current than the stored count value.

Different parameters can be entered when the NONCE value is being constructed or, as the case may be, created by unit 7 of transmitting node 2-1 or of receiving node 2-2. Said parameters can in a possible embodiment also include a priority field alongside a count value or node address. For example a frame counter that counts the number of transmitted frames F is suitable as a counter.

The method for transmitting data between network nodes 2 of a network 1 in a cryptographically protected manner is suitable in particular also for networks 1 that do not have a synchronized time of day. For example the method is suitable in particular for a wireless sensor network WSN, meaning for a network of sensor nodes in which there is no synchronized time-of-day information.

The bit width of the count value CTR used for checking the currency of a NONCE value N is selected preferably as being relatively wide, comprising, for example, 32, 48, or 64 bits. That is because the wider the counter is or, as the case may be, the larger the counter value range is, the less often the key K will have to be determined and the less often the key K will need to be reconfigured. The bit width of the counter value CTR can, though, also be selected as being relatively small, comprising, for example, 4, 8, or 16 bits. That has the advantage that only a few bits will have to be stored and, in particular, transmitted for the counter value CTR used.

Data can be encrypted using different encryption algorithms with the aid of the key K and the created NONCE value N. For example the data can be encrypted cryptographically by an AES or DES algorithm for protecting the frame F from manipulation. They are preferably used in a CCM mode.

The constant value EANCV used for creating the NONCE value N is preferably valid throughout the network. That means that all network nodes of the network 1 will use the same EANCV value for encrypting and decrypting. The constant value EANCV is in a variant assigned to a subgroup of the nodes or, as the case may be, to a subset of network nodes 2 for communicating among themselves.

The cryptographic key K employed in an encrypting operation can be any key. The key can be, for example, a network key that is known to all network nodes 2 of network 1. In an alternative embodiment the key employed is a link key that is known to two directly adjacent network nodes of network 1. In another embodiment the key K can be an end-to-end key which at the communication terminations or, as the case may be, end nodes is known to, for example, two sensor nodes or to one sensor node and one gateway node. The key K is in other embodiments a broadcast key or multicast key. The NONCE value N employed for encrypting can be created by concatenating bit sequences of different parameters with the constant value EANCV, for example by concatenating the constant value EANCV with a count value CTR and a transmitting-node address SA. In a possible embodiment the bit width of the created NONCE value N is variable. If the length or, as the case may be, bit width of the EANCV value is too large, for example if chains of text characters of any length are used, a NONCE value N having a fixed predefined length can be calculated with the aid of a hash function.

The constant value EANCV currently valid respectively in the network or, as the case may be, a subnetwork is in a preferred embodiment assigned to network nodes 2 of network 1 by a central management node, with the management node being, for instance, a gateway, a network management server, or a security server or security manager. Said EANCV value is assigned to the various nodes 2 of network 1 by the management node likewise in a cryptographically protected manner.

The method offers protection from what are termed replay attacks. A frame F that was transmitted in the past and is intercepted by a third party and entered by said third party can be detected using the transmission method. The frame F that is entered and was generated using a non-current EANCV value will not be accepted by receiving node 2-2. Additional protection from replay attacks is achieved with the aid of the co-transmitted count value CTR. The receiving node therein stores information data about the count value CTR last received from a transmitting node 2-1. In the method the count value CTR is advantageously taken from a relatively small value range comprising, for example, 4, 8, or 16 bits, because the count value CTR has to be unique in relation only to each constant value EANCV.

Figure 6:
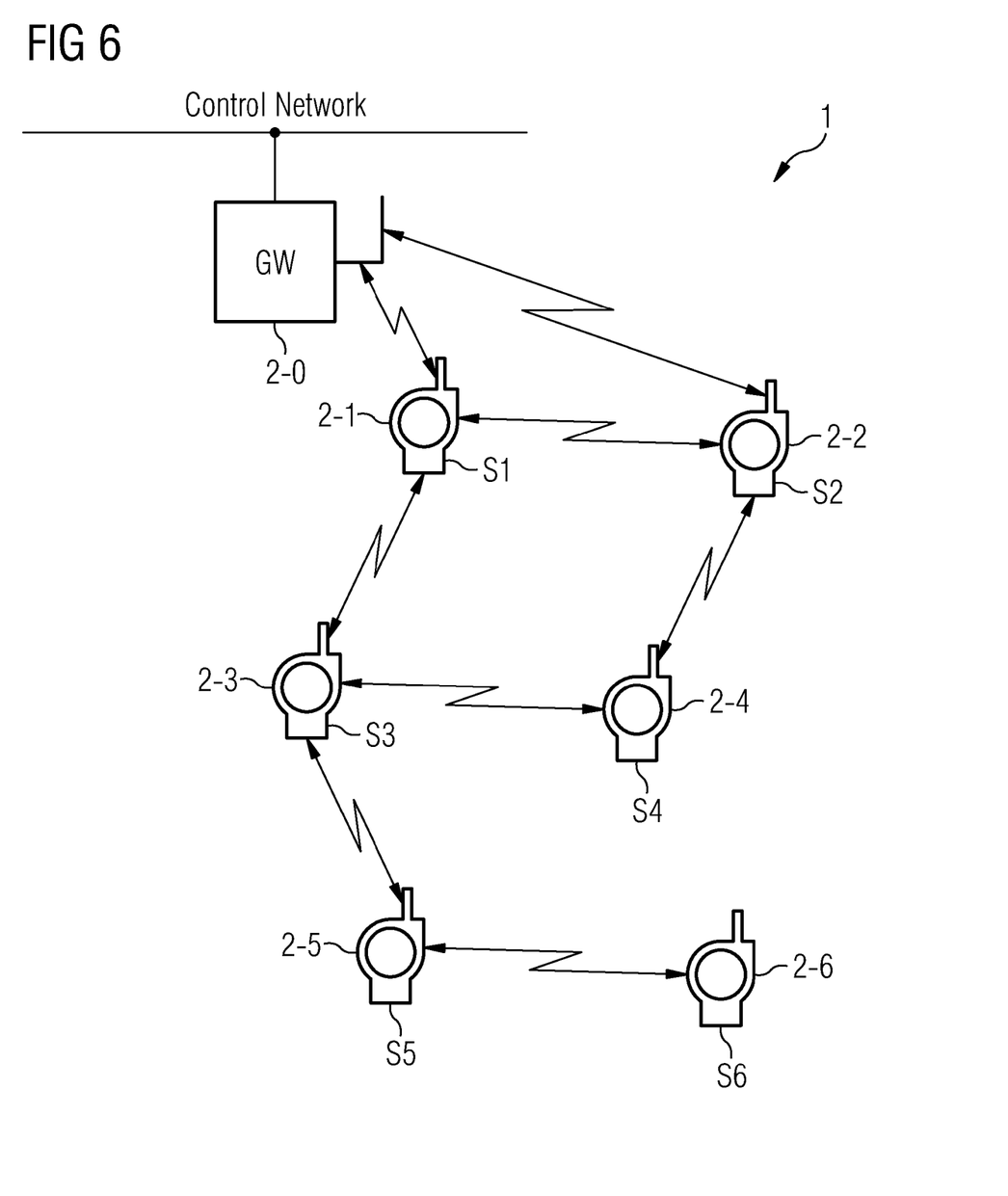
FIG. 6 is an example of the proposed network in the case of which messages are transmitted between network nodes in accordance with the method.

In the exemplary network shown in FIG. 6, six sensor nodes 2 can communicate with a gateway node 2-0 over a radio interface. In the exemplary embodiment shown in FIG. 6, gateway node 2-0 makes a constant value EANCV employed throughout the network available to the other network nodes 2-1 to 2-6. Sensor nodes 2-1, 2-3, 2-4, 2-5, 2-6 each have at least one sensor for registering measurement data, for example an ambient temperature. Said measurement data is encrypted and transmitted as frames F for evaluating the measurement data. The EANCV value is preferably conveyed by the central management node, meaning by gateway node 2-0 of wireless sensor network 1, to the other nodes 2-1 to 2-6 which store the EANCV value for further use. The EANCV value is conveyed in manipulation-proof manner. That can be done by, for example, protected transmission between central gateway 2-0 and sensor nodes 2-1 to 2-6. The connection alternatively constitutes a hash chain in the case of which a hash value of the updated EANCV value is derived from the previous EANCV value.

Figure 7A:
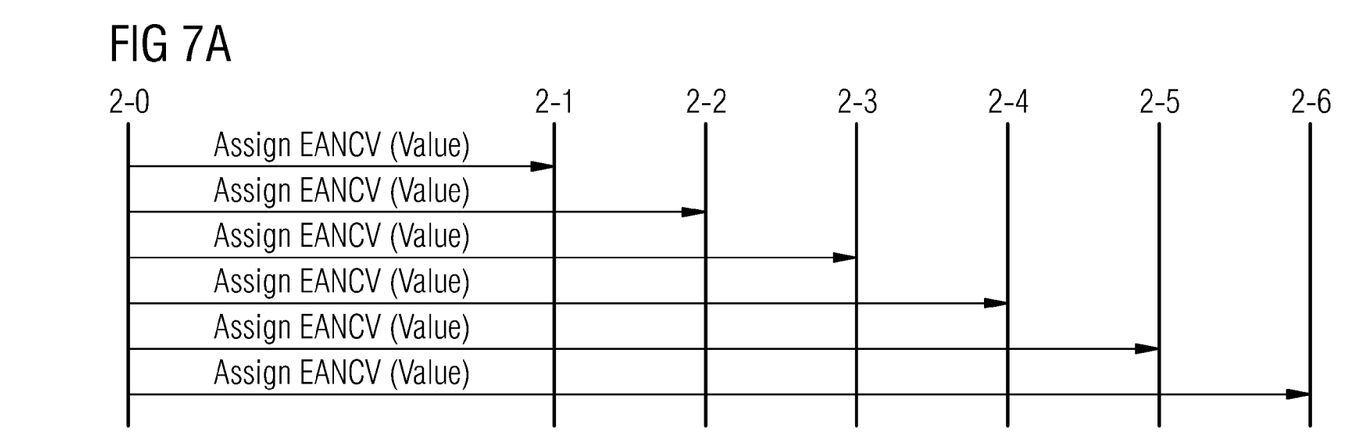
FIGS. 7A and 7B show various variants of a central management network node's making a shared constant value available in the case of the method.
Figure 7B:
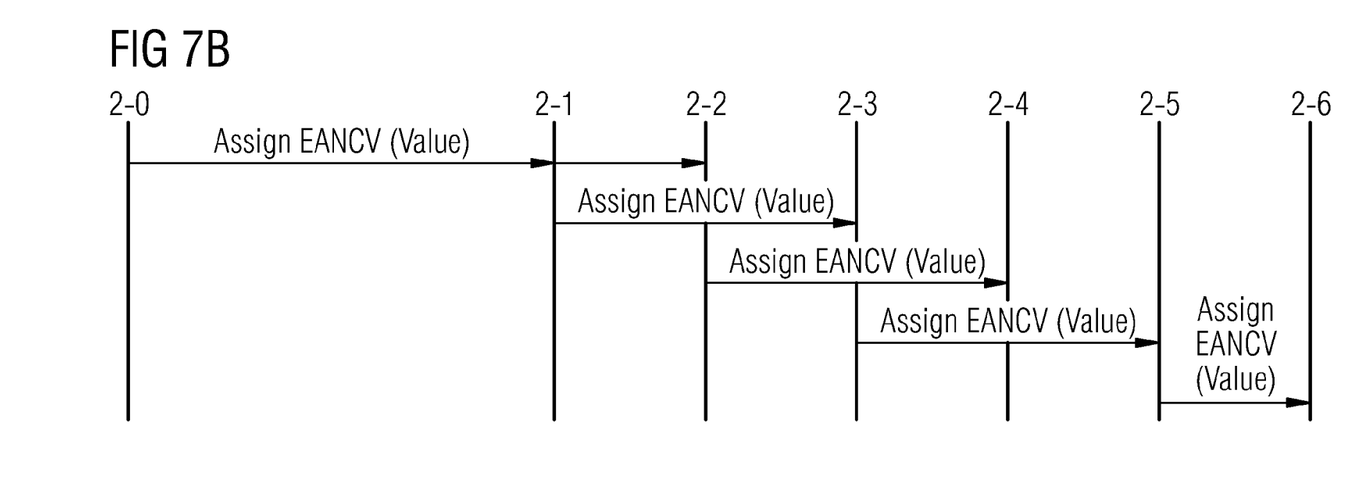

FIGS. 7A, 7B show different alternatives for conveying an EANCV value from a management node 2-0 to other network nodes. In the alternative shown in FIG. 7A the EANCV value is conveyed by gateway node 2-0 separately to the various sensor nodes 2-1 to 2-6 of network 1 in each case by a unicast message (assign). That means that each sensor node 2-1 to 2-6 receives the current EANCV value separately.

In the alternative shown in FIG. 7B the EANCV value is conveyed by a broadcast or, as the case may be, multicast message. The current EANCV value is in that manner of conveying forwarded by gateway node 2-7 over intermediate nodes. Network 1 can therein be flooded so that all sensor nodes will receive the assignment message having the current EANCV value.

Figure 8:
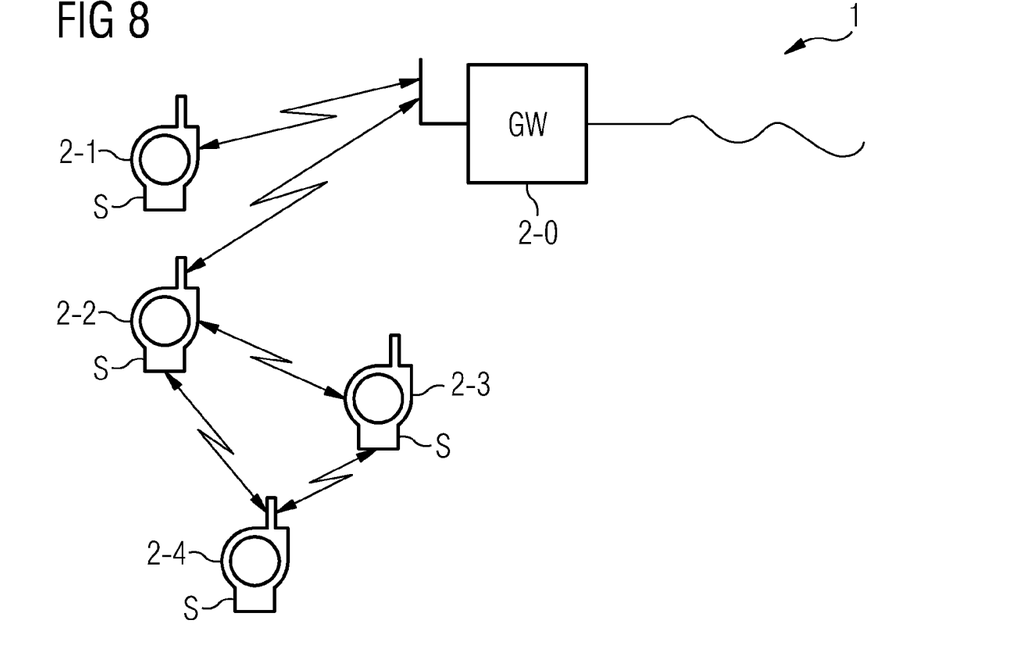
FIG. 8 shows an exemplary embodiment of a network.

FIG. 8 shows another exemplary embodiment of network 1. In that exemplary embodiment it is a sensor network featuring multi-hop mesh topology.

Figure 9:
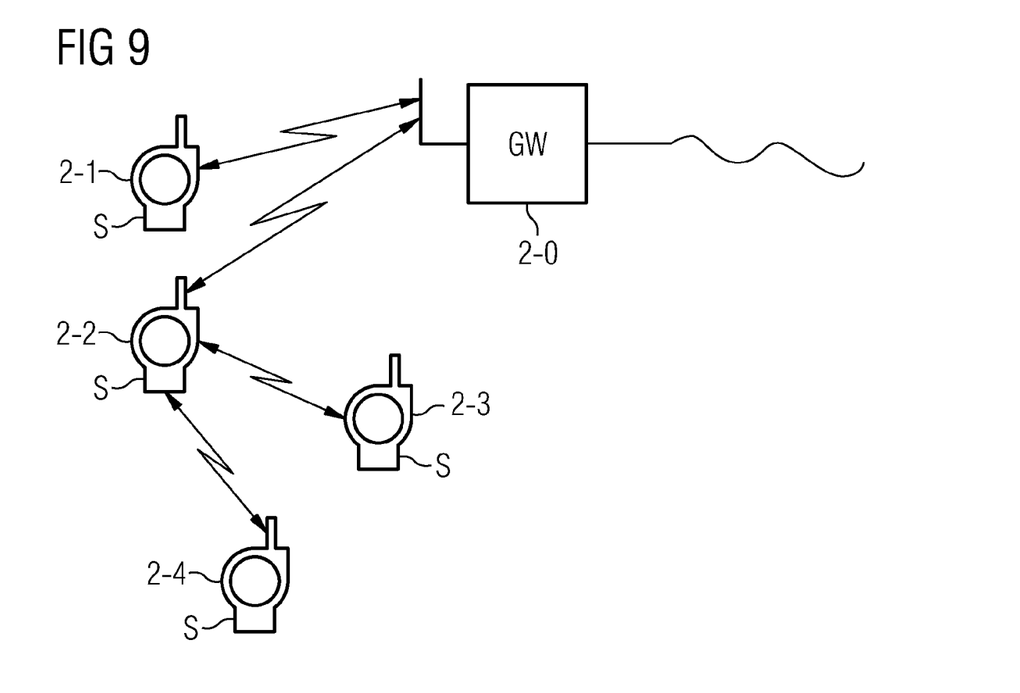
FIG. 9 shows another exemplary embodiment of a network.

FIG. 9 shows another exemplary embodiment of network 1 featuring multi-hop network topology having a tree structure.

Figure 10:
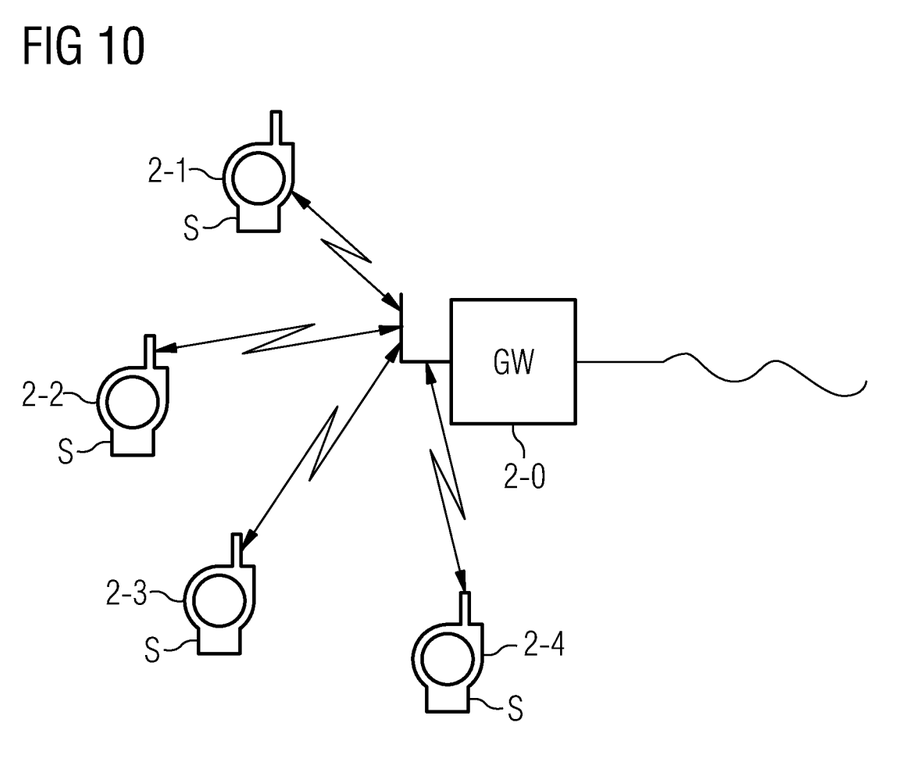
FIG. 10 shows another exemplary embodiment of a network.

FIG. 10 shows another exemplary embodiment of network 1 featuring single-hop network topology or, as the case may be, a radial structure.

In the exemplary embodiments shown in FIGS. 8-10, network nodes 1 are formed by sensor nodes each having at least one sensor. The method is not, though, limited to transmitting messages between sensor nodes 2; rather it is the case that the network nodes can also have actuators or, as the case may be, a combination of sensors and actuators. In a possible embodiment, gateway 2-0, as shown in FIGS. 6-10, is linked to a computer network, for example an intranet or a production network. In a possible embodiment there can also be a plurality of gateways.

Network 1 is moreover not limited to wireless networks. The messages F between different network nodes 2 of network 1 can be transmitted also on a wire-linked basis over a line.

In network 1 the same EANCV value is used for communicating between nodes 2. Only little storage space is therein required in each of the various nodes 2 because just one, shared EANCV value has to be stored regardless of the number of communication partners and keys used. Thus in the method it is not necessary, for example, to store a value for each communication partner or for each key or each combination of communication partner and key. It is hence possible to achieve a long effective NONCE length accompanied by a low volume of data requiring to be stored. The requirement for re-keying is obviated thereby or, as the case may be, re-keying has to be performed only seldom. That also enables the counter value range to be kept relatively small.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for transmitting data between network nodes of a network in a cryptographically protected manner, comprising:
   creating a NONCE value from a count value that is updated when a message containing the data is transmitted and from a constant value that is made available to the network nodes of the network in shared fashion, the constant value being the same for each of the nodes of the network;
   encrypting and decrypting the data transmitted in the message by a cryptographic key and the NONCE value; and
   reconfiguring the constant value at regular intervals and providing the constant value to the network nodes of the network by a central management network node.

2. The method as claimed in claim 1, wherein the NONCE value is also created as a function of a transmitting-node address of a transmitting network node that transmits the message to receiving network node of the network.

3. The method as claimed in claim 1, wherein the constant value is conveyed to the network nodes of the network by the central management network node by sending a broadcast message or by sending unicast messages.

4. The method as claimed in claim 1, wherein the constant value is reconfigured by the central management node.

5. The method as claimed in claim 4, wherein the constant value is reconfigured at regular intervals, when a predefined volume of transmitted data has been transmitted, when a predefined number of messages has been transmitted, when a predefined count value has been attained for one of the network nodes, if a predefined event occurs, or when data meeting a predefined condition is transmitted.

6. The method as claimed in claim 2, wherein
   the count value is generated by an internal counter of the transmitting network node, and
   the NONCE value is created by concatenating the transmitting-node address of the transmitting network node, the constant value, and the count value.

7. The method as claimed in claim 2, wherein
   the count value is generated by an internal counter of the transmitting network node,
   concatenated data is created by concatenating the transmitting-node address of the transmitting network node, the constant value, and the count value, and
   the NONCE value is created through a hash function of the concatenated data.

8. The method as claimed in claim 1, wherein the data transmitted in the message is encrypted and decrypted using a Counter with CBC-MAC (CCM) algorithm.

9. The method as claimed in claim 2, wherein
   the count value is a current count value of the transmitting network node,
   the message is transmitted with header data and useful data,
   the header data comprises the transmitting-node address, a receiving-node address, and the count value, and
   the useful data comprises encrypted data.

10. The method as claimed in claim 9, wherein
    the receiving network node extracts the transmitting-node address and the count value from the header data,
    the receiving network node has an internal counter, which produces a count predict value based on the transmitting-node address,
    the receiving network node compares the count value of the transmitting network node with the count predict value produced by the internal counter,
    if the count value of the transmitting network node is more current than the count predict value, the receiving network node creates a NONCE value from the count value of the transmitting network node, the shared constant value, and the transmitted transmitting-node address, and
    the receiving network node decrypts the data transmitted in the message with the NONCE value created by the receiving network node and a key stored in the receiving network node.

11. The method as claimed in claim 2, wherein the message is transmitted from the transmitting network node to the receiving network node over a radio interface.

12. A network, comprising:
    a plurality of network nodes that transmit data among themselves in messages, each network node comprising:
       a NONCE unit to create a NONCE value from a count value that is updated when a message is transmitted and from a constant value that is made available to the network nodes of the network in shared fashion, the constant value being the same for each of the nodes of the network; and
       a cryptographic unit to encrypt and decrypt the data transmitted in the message using a cryptographic key and the NONCE value; and
    a central management network node that reconfigures the constant value at regular intervals and provides the constant value to the network nodes of the network.

13. The network as claimed in claim 12, wherein the network nodes each have at least one sensor.

14. A non-transitory computer readable storage medium storing a computer program, which when executed by a computer, causes the computer to perform a method for transmitting data between network nodes of a network in a cryptographically protected manner, the method comprising:
    creating a NONCE value from a count value that is updated when thea message containing the data is transmitted and from a constant value that is made available to the network nodes of the network in shared fashion, the constant value being the same for each of the nodes of the network;
    encrypting and decrypting the data transmitted in the message by a cryptographic key and the NONCE value; and
    reconfiguring the constant value at regular intervals and providing the constant value to the network nodes of the network by a central management network node.

* * * * *

UNITED STATES PATENT AND TRADEMARK OFFICE
CERTIFICATE OF CORRECTION

| | | |
|---|---|---|
| PATENT NO. | : 9,094,818 B2 | Page 1 of 1 |
| APPLICATION NO. | : 12/998029 | |
| DATED | : July 28, 2015 | |
| INVENTOR(S) | : Rainer Falk et al. | |

It is certified that error appears in the above-identified patent and that said Letters Patent is hereby corrected as shown below:

In the Claims

Claim 14, Column 14, Line 49 (Approximately)

Delete "thea" and insert --a--, therefor.

Signed and Sealed this
Twenty-seventh Day of October, 2015

Michelle K. Lee
*Director of the United States Patent and Trademark Office*